UNITED STATES PATENT OFFICE.

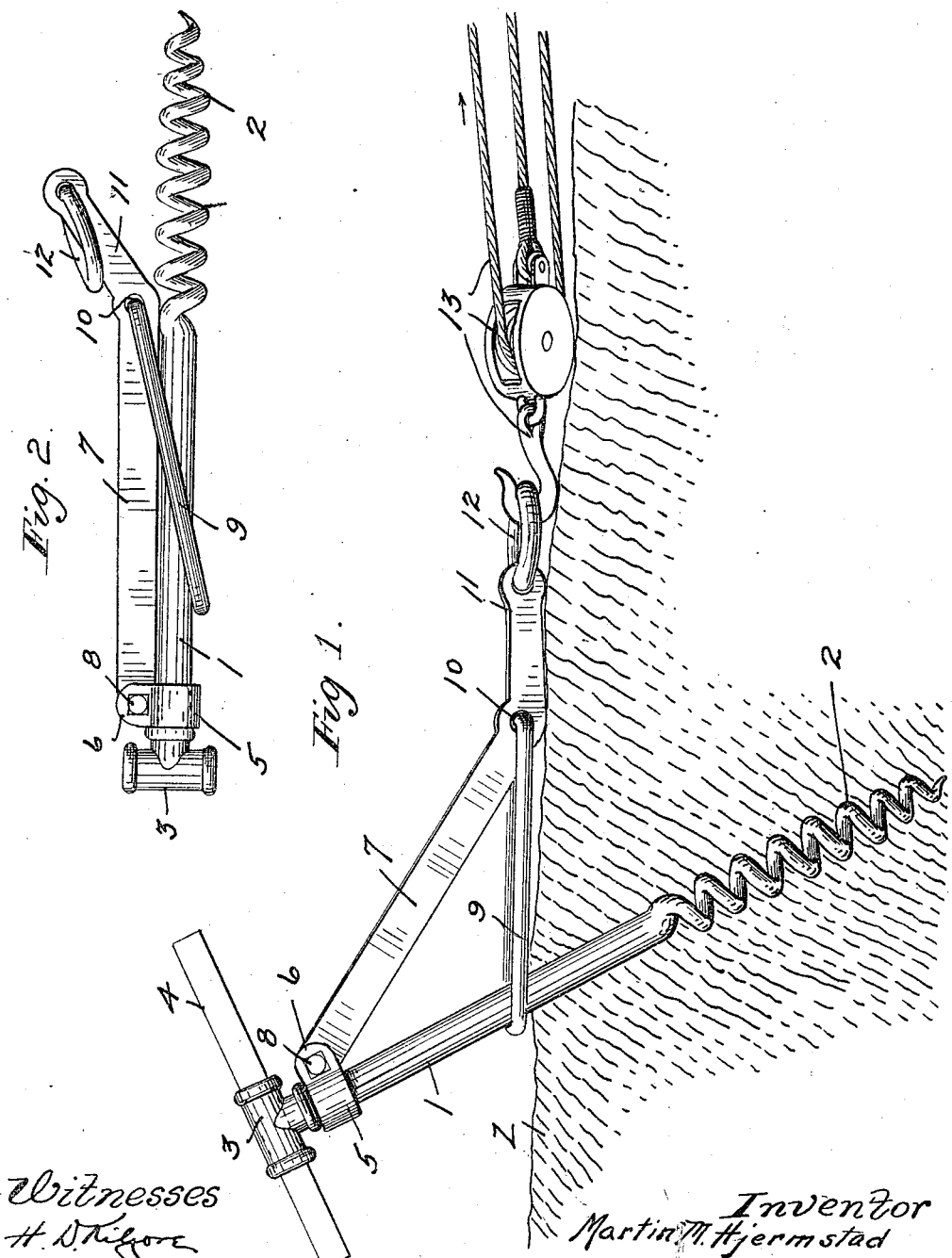

MARTIN M. HJERMSTAD, OF KENYON, MINNESOTA.

ANCHORING DEVICE.

1,230,711.

Specification of Letters Patent. Patented June 19, 1917.

Application filed June 5, 1916. Serial No. 101,754.

*To all whom it may concern:*

Be it known that I, MARTIN M. HJERMSTAD, a citizen of the United States, residing at Kenyon, in the county of Goodhue and State of Minnesota, have invented certain new and useful Improvements in Anchoring Devices; and I do hereby declare the following to be a full, clear, and exact description of the invention, such as will enable others skilled in the art to which it appertains to make and use the same.

My invention relates to improvements in anchoring devices; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a perspective view illustrating the invention secured in the ground ready for use; and Fig. 2 is a side elevation of the invention removed from the ground and folded in an inoperative position.

The numeral 1 indicates a round bar having an auger-like lower end 2, adapted to be turned into or out of the ground Z by the rotation of said bar. On the upper end of the bar 1, is rigidly secured a T-head 3, having an eye or passageway which extends transversely of the bar 1 to removably receive a hand piece 4, by which the bar 1 may be turned. This hand piece 4 may be a piece of wood, iron or any other convenient object, by which the bar 1 may be turned.

Swiveled on the body of the bar 1, with freedom for longitudinal sliding movement thereon, is a collar 5, having a radially projecting lug 6. The T-head 3 limits the upward sliding movement of the collar 5 on the bar 1. The upper end of a forwardly and downwardly inclined thrust rod 7 is pivoted to the lug 6 by a bolt 8, for vertical swinging movement. A long endless link 9 connects the lower end of the thrust rod 7 to the bar 1 at the ground line. The bar 1 extends through the link 9 and said link has free vertical sliding and horizontal swinging movements on said bar. The outer end of the link 9 extends through a perforation 10 formed in the lower end of the thrust rod 7 and connects the link 9 thereto, with freedom for vertical swinging movement.

Integrally formed with the lower end of the thrust rod 7 is a horizontal extension 11, which rests directly on the ground Z and forms an extension of the link 9. In the outer end of the extension 11, is a ring 12 to which is attached a block and tackle 13. Obviously, the link 9, thrust rod extension 11, ring 12 and block and tackle 13 form a pulling connection attached to the bar 1 at the ground line.

Preferably, the bar 1 is set in the ground on an angle, as shown in Fig. 1. Under pulling strains on the block and tackle 13, the link 9 tends to work down on the bar 1 and the thrust rod 7, reacting against the upper end of the bar 1 prevents said bar from straightening to any particular degree. The collar 5, under pulling strains on the thrust rod 7, will twist on the bar 1 and hence, not slip downward. As the collar 5 thus locks the thrust rod 7 to the bar 1, pulling strains on said thrust rod tend to draw the bar 1 into the ground.

The above described invention is especially designed for use in pulling stuck automobiles out of the mud, sand or snow, but will be found to be highly serviceable for use in connection with stump pullers, wire stretchers and the like. When not in use, the anchoring device may be folded, as shown in Fig. 2. When the device is folded, the same is very compact and can be stored in a small space.

What I claim is:—

1. An anchoring device comprising a bar adapted to be secured in the ground, a downwardly and forwardly inclined thrust rod through the upper end of which said bar is inserted with freedom to rotate, a horizontal link connecting the outer end of the thrust rod to said bar and in which link the bar is free to move endwise and rotate, and a pulling connection attached to the outer end of the link.

2. An anchoring device comprising a bar adapted to be secured in the ground, a downwardly and forwardly inclined thrust rod having at its outer end a horizontal ground-engaging extension, said bar being inserted through the upper end of the thrust rod with freedom to rotate, a horizontal link pivoted to the thrust rod at the angle therein and connecting the same to the bar, said bar being inserted through the link with freedom to move endwise and rotate, and a pulling connection attached to said extension.

3. An anchoring device comprising a bar adapted to be secured in the ground and having a hand piece equipped head, a collar swiveled on the bar and engaging said head as an abutment, a downwardly and forwardly inclined thrust rod having its upper end pivoted to the collar for vertical swinging movement and provided at its outer end with a horizontal ground-engaging extension, a horizontal link pivoted to the thrust rod at the angle therein and connecting the same to the bar, said bar being inserted through the link with freedom to move endwise and rotate, and a pulling connection attached to said extension.

In testimony whereof I affix my signature in presence of two witnesses.

MARTIN M. HJERMSTAD.

Witnesses:
C. J. TALLE,
INGRAM BRUSLETTEN.

Copies of this patent may be obtained for five cents each, by addressing the "Commissioner of Patents, Washington, D. C."